United States Patent [19]

Stark

[11] Patent Number: 5,207,732
[45] Date of Patent: May 4, 1993

[54] FLY FISHING LINE

[75] Inventor: John E. Stark, Maplewood, Minn.

[73] Assignee: Minnesota Mining & Manufacturing Company, St. Paul, Minn.

[21] Appl. No.: 703,608

[22] Filed: May 21, 1991

[51] Int. Cl.⁵ .............................................. A01K 91/00
[52] U.S. Cl. .................................................. 43/44.98
[58] Field of Search ................ 43/44.98; 428/383, 395

[56] References Cited

U.S. PATENT DOCUMENTS

| 3,043,045 | 7/1962 | Martuch | 43/44.98 |
| 3,523,034 | 8/1970 | Howald | 43/44.98 |
| 3,758,979 | 9/1973 | Martuch et al. | 43/44.98 |
| 3,849,929 | 11/1974 | Martuch | 43/44.98 |
| 3,914,480 | 10/1975 | Lang | 43/44.98 |
| 3,936,335 | 2/1976 | Martuch | 43/44.98 |
| 4,330,956 | 5/1982 | McCarthy | 43/44.98 |
| 4,386,132 | 5/1983 | Dille | 43/44.98 |
| 4,459,337 | 7/1984 | Hansen | 43/44.98 |
| 4,584,240 | 4/1986 | Herbert | 43/44.98 |
| 4,606,144 | 8/1986 | Sasaki | 43/44.98 |

*Primary Examiner*—Kurt C. Rowan
*Attorney, Agent, or Firm*—Gary L. Griswold; Walter N. Kirn

[57] ABSTRACT

A fishing line with an outer coating such as a poly(vinyl chloride) resin that includes a polymerized polyfunctional acrylic monomer, the line exhibiting a combination of improvement in durability, shootability and recoil memory.

9 Claims, No Drawings

FLY FISHING LINE

BACKGROUND OF THE INVENTION

1 Field of the Invention

This invention relates to fly fishing lines, and in particular to a fly fishing line that exhibits a combination of improved properties, especially shootability, durability, and low recoil memory not found in previous fly lines.

2. Description of the Prior Art

This description speaks to those familiar with the requirements of fly lines, both of the sinking and floating variety, and the features of fly lines that are known in the prior art, e.g., as described in U.S. Pat. Nos. 3,043,045; 3,914,480; and 4,386,132. These patents describe the desirable characteristics of a fly line (see, in particular, column 1, lines 40–60 of U.S. Pat. No. 3,043,045). One of the most evasive combinations of properties is durability and low recoil memory, on the one hand, and shootability, on the other hand, because durability and low recoil memory are directly proportional to line flexibility and shootability inversely proportional to that attribute. Lack of durability is associated with brittleness or hardness (stiffness) of the line that results in cracking under the stresses encountered in casting a fly line. Shootability, on the other hand, is enhanced by a hard or stiff line. The line "shoots" through the fly rod guides with less loss of force (through friction) than a flexible, floppy line encounters, with consequent increase in casting distance. Recoil memory, i.e., the tendency of a fly line to remain in the coiled state it assumes on the fly reel, is directly proportional to the stiffness of the line, or at least that was conventional wisdom until the present invention. However, the present invention, owing to the inclusion of an ingredient not heretofor included in a fly line coating, negates the antagonism previously thought to exist between durability, low memory recoil, and shootability. This change from conventional wisdom is due to the inclusion in the coating, generally derived from a poly(vinyl chloride) resin plastisol, of a polymer derived from a plasticizing, polymerizable monomer, particular a polyfunctional acrylic monomer such as trimethylol propane trimethacrylate.

At this juncture in the description of this invention, there should be noted certain general disclosures relating to the use of the above-mentioned polymerizable, plasticizer monomers in poly(vinyl chloride) resin plastisols. See, for example, *Encyclopedia of PVC*, 2nd Ed., pp. 534–35 (1986); *Acrylic Monomers in PVC Plastisols*, 29 SPE J, pp. 56–62 (Feb. 1973), and *Functional Acrylic Monomers As Modifiers For PVC Plastisol Formulations*, Sartomer Company, Inc. (1989). These, and perhaps other publications, discuss certain benefits from inclusion of acrylic monomers in poly(vinyl chloride) plastisols.

SUMMARY OF THE INVENTION

In its broadest aspect the present invention may be described as the inclusion in a fly line outer coating, preferably a poly(vinyl chloride) resin coating, of a polymer derived at least in part from one or more polymerizable polyfunctional acrylic monomers. The plastisol including the acrylic monomer is coated on a conventional line core, e.g., braided nylon or polyester yarns or monofilaments, and subjected to sizing and heat processing to define the desired taper and polymerize the acrylic monomer in situ. The fly line may be a floating line, i.e., a line with a specific gravity of 0.95 or less owing to the presence of microballoons, gaseous filled cells, or other well known ingredients; sinking; or a combination of the two. Various additional ingredients are also included in the coating; basically conventional ingredients present in fly line plastisols. There is, however, an additional ingredient, namely, an initiator for the polymerization of the polyfunctional acrylic monomer that is present in the plastisol used to produce the coating of the present invention.

DESCRIPTION OF THE PREFERRED EMBODIMENT

It is important to point out at this juncture that conventional (non-polymerizable) plasticizers have been employed for some time as ingredients in poly(vinyl chloride) plastisol compositions for use as fly line coatings. Indeed, it was the presence of these plasticizers that forced the compromise between durability, recoil memory, and shootability as described above. Plasticizer increase translated to added flexibility (thereby improving durability), reduction in coil memory, but also, unfortunately, reduction in shootability. Coil memory, by the way, is the maddening tendency of a fly line to remain in the wound or coiled state it assumes on the fly reel, a state antithetical to a long, straight, accurate cast. The desire is to eliminate or at least reduce coil memory without sacrificing other properties. Thus, the greater the amount of conventional plasticizer, the greater the durability and the lesser the recoil memory, both desirable characteristics, but the poorer the shootability. With the present invention, one can achieve the best of all worlds; namely, good durability, low memory recoil, and good shootability. It should also be noted that while increasing conventional plasticizer content did improve durability, over time the plasticizers migrated to the line surface and were leached out. This depletion in plasticizer content resulted in loss of flexibility, and cracking, i.e., reduction in durability. In the present invention, not only does the polymeric plasticizer permit achievement of high durability, good shootability, and low memory recoil, but these properties can be sustained to provide longer line life owing to the permanency and non-migratory nature of the polymeric plasticizer.

By way of example, and not limitation, the following example is provided.

EXAMPLE

The following is the base formulation for the preferred plastisol, wherein PHR signifies parts by weight per 100 parts vinyl resin:

| TRADE-NAME | DESCRIPTION | GRAMS | PHR | FUNCTION |
|---|---|---|---|---|
| Plasthall DTDP | Ditridecyl Phthalate | 5670 | 25 | Plasticizer |
| Monoplex S-73 | Epoxidized 2-Ethyl Hexyl Tallate | 6124 | 27 | Plasticizer |
| Sartomer 350 | Trimethylol Propane Trimethacrylate | 1134 | 5 | Monomer |
| Geon 121 | BF Goodrich Vinyl | 22680 | 100 | Vinyl Resin |
| Mark 4701 | Barium-Zinc Heat Stabilizer | 454 | 2 | Stabilizer |
| Uvinul N-539 | Liquid UV Absorber | 181 | 0.8 | UV Absorber |
| Lupersol 575P75 | t- Amylperoxy 2 Ethyl-Hexanoate | 17 | 0.07 | Initiator |

-continued

| TRADE-NAME | DESCRIPTION | GRAMS | PHR | FUNCTION |
|---|---|---|---|---|
| DC-200 | 200,000 CS Silicone Oil Dow Corning | 1134 | 5 | Lubricant |

The mixture also contains glass microbubbles present in a quantity to give a specific gravity of about 0.87 in the finished line and pigments to give the desired line color.

The formulation process is a mixing of the charges to disperse the powdered vinyl resin completely in the plasticizers and other additives. The DTDP and S-73 are charged to the 80 quart vessel of a Hobart M802 mixer and agitated for 5 minutes until blended. The Geon 121 is then added and mixed at low speed until coated with the plasticizers. The paste is then mixed at a higher speed for 10 minutes to continue to disperse the resin in the plasticizer blend. The trimethylol propane trimethacrylate, Mark 4701, Uvinul N-539 and DC 200 (all liquids) are then charged and mixed at a medium speed for 20 minutes. The plastisol at this point is held until ready for coating at which time the initiator, glass bubbles and pigments are added and the mixture deaerated under vacuum to remove any trapped air in the plastisol. The initiator is added at the end of the process to minimize the possibility of early polymerization of the monomer prior to coating and vinyl fusion at elevated temperatures.

The plastisol is applied to the fly line core using the following procedure. The core of choice (nylon yarn, braided monofilament, or monofilament) is passed through a primer tank containing primer as discussed below to improve adhesion of the coating to the core surface. The primed core is heated to 350° F. to dry off all solvents from the priming step and to remove any water absorbed into the core. The core is dipped into a pan containing the plastisol and then brought through a variable orifice wipe die to shape the coating diameter and give the finished line its proper taper configuration. The coated line is run vertically and under low tension (about 1 to 5 p.s.i.) through a forced air oven at 7-15 feet per minute line speed and at an oven temperature of 380° F. to fuse the vinyl and polymerize the trimethylol propane trimethacrylate monomer. The finished line is air cooled during return to coiling skeins prior to repackaging into finished lines.

Two primers are employed to enhance adhesion of the plastisol to the core. The first is sold under the tradename Vulcabond V-36 available from Stabond Corporation. The solid material is a nitrile elastomer/rubber which is dissolved for application with methyl ethyl ketone. The second primer, sold under the tradename Morthane CA-100, is a polyester bulk polymerized urethane elastomer containing hydroxyl end groups available from Morton Thiokol, Inc. This solid elastomer is also dissolved in methyl ethyl ketone prior to application to the fly line core.

Suitable glass microspheres are manufactured by 3M under the trade designation bubble type G18/500. The nominal average particle density of these bubbles is 0.18 grams per cubic centimeter and the isostatic strength of the soda lime borosilicate glass is 500 p.s.i.

As can be seen from the above example, numerous ingredients are included in the plastisol in addition to the poly(vinyl chloride) resin and polymerizable acrylic monomer, including conventional plasticizers, heat stabilizers, UV light absorbers, and lubricants. Ditridecyl phthalate is a preferred nonpolymerizable plasticizer, present optimally at 25 parts per 100 parts of vinyl resin. Epoxidized 2-ethyl hexyl tallate is a plasticizer containing epoxy groups which aid in the heat stabilizing ability of the barium-zinc liquid present in the plastisol. Plastisols should preferably contain a minimum of 5 parts per hundred vinyl resin of this family of epoxy materials. This compound has excellent permanency and low temperature flexibility properties and compliments the ditridecyl phthalate well in processing. A preferred total level of nonpolymerizable plasticizer is on the order of 52 parts per hundred vinyl resin, it being understood that variations in the level of this and other conventional ingredients can vary within the scope of the present invention.

The polymerizable plasticizer monomer should generally be present in an amount of about 2 parts to about 20 parts, preferably 3 to 10 parts, and most preferably about 5 parts by weight per 100 parts of vinyl resin in the plastisol. Acrylic monomers should be polyfunctional, particularly difunctional, or trifunctional, the latter being preferred. Methacrylates are preferred over acrylates. Trimethylol propane trimethacrylate is the preferred compound. The monomer should be compatible with the other ingredients of the plastisol and be consistent in its effects on the coating. Other monomers investigated include:

Tetraethylene glycol diacrylate; and
1,6 Hexanediol dimethacrylate.

A preferred polyvinyl chloride resin is sold by B. F. Goodrich under the tradename GEON 121, having an inherent viscosity of 1.19.

It is highly desirable to include an initiator for the polymerization of the monomeric acrylic ingredient described above. A peroxide initiator of the type shown in the example is preferred.

The method of making the fly line of the present invention is adequately described in the foregoing example. The plastisol must be subjected to a temperature that will enable a smooth, permanent coating of the vinyl resin and in situ polymerization of the polymerizable plasticizer monomer (i.e, polymerization on the core after coating and shaping of the plastisol).

The coating of the present invention achieves a combination of previously regarded antagonistic properties as a result of the presence of a plasticizer in a new, non-migrating, permanent form. Conventional plasticizers tend to migrate to the coating surface and leach over time, resulting in brittleness and loss of durability. For the first time in fly line production a line can be produced by the addition of a plasticizer without loss of shootability, a property that translates into long accurate casts. The polymerized plasticizer provides a three-dimensional network within the plasticized vinyl resin to increase stiffness while retaining the integrity of the system.

The fly line coating of the present invention obtains its stiffness through the polymerization of a monomer while the line is partially stretched in a straight configuration during processing. The result is a polymer network whose lowest state of energy, its most relaxed configuration, is when it is straight. At ambient temperatures, the fly line will straighten quickly when taken off of a reel. Under cooler conditions when memory is more of a problem, a few casts with this line will straighten any set caused by storage on the reel.

The polyfunctional acrylate is polymerized into the vinyl matrix during fusion of the coating. The amount of polymerizable monomer used determines the stiffness increase of the vinyl coating. The added solvating power of the monomer enables a reduction of total plasticizer levels. The polymerized monomer in the vinyl gives the coating more integrity, not the increased brittleness seen with simple reductions in plasticizer loading.

What is claimed is:

1. A fly line comprising a core, and a coating adherably bonded to said core, said coating comprising a polyvinyl chloride resin, an in situ formed polymer to provide increased stiffness to said line, said polymer being derived from at least one polymerizable monomer including a polyfunctional acrylic monomer, and an initiator for polymerizing said acrylic monomer.

2. The fly line of claim 1 wherein said polymer is a homopolymer of a polyfunctional methacrylate.

3. The fly line of claim 1 wherein said polyfunctional acrylic monomer is trimethylolpropane trimethacrylate.

4. The fly line of claim 1 wherein said polymer is a homopolymer of trimethylolpropane trimethacrylate.

5. A method of making a fly line comprising:
   (a) coating a fly line core with a plastisol comprising:
      (1) a polyvinyl chloride resin,
      (2) a polyfunctional polymerizable acrylate monomer, and
      (3) an initiator for a polymerization reaction including said acrylate monomer, and
   (b) exposing said plastisol to conditions providing formation of a polymer derived from said acrylate monomer to provide increased stiffness to said line whereby a fly line is produced having improved durability, shootability and low recoil memory.

6. The method of claim 5 wherein said acrylate monomer is trimethylol propane trimethacrylate present to the extent of from about 2 parts by weight to about 20 parts by weight per 100 parts by weight of poly(vinyl chloride) resin.

7. A fly line comprising a nylon core, a primer, and a coating overlying said primer and adherably bonded to said core, said coating comprising a fused poly(vinyl chloride) resin, from about 3 parts by weight to about 10 parts by weight per 100 parts poly(vinyl chloride) resin of a polymeric plasticizer in the form of a homopolymer derived from trimethylol propane trimethacrylate polymerizable monomer, and an initiating amount of an initiator for said polymerizable monomer.

8. A method for providing a fly line with an improved combination of durability, shootability, and recoil memory, said fly line including a core and a coating applied thereto, said method comprising incorporating in said coating an in situ formed polymer derived from a polyfunctional polymerizable acrylic monomer in the presence of an initiator for said polymerizable monomer to provide increased stiffness to said line.

9. The method of claim 8 wherein said acrylic monomer is trimethylol propane trimethacrylate.

* * * * *

UNITED STATES PATENT AND TRADEMARK OFFICE
CERTIFICATE OF CORRECTION

PATENT NO. : 5,207,732
DATED : May 4, 1993
INVENTOR(S) : John E. Stark

It is certified that error appears in the above-identified patent and that said Letters Patent is hereby corrected as shown below:

Column 6, lines 1-2 - delete"(3) an initiator for a polymerization reaction including said acrylate monomer, and "

Signed and Sealed this

Eleventh Day of January, 1994

Attest:

BRUCE LEHMAN

Attesting Officer      Commissioner of Patents and Trademarks